Nov. 9, 1965    W. F. MOORE ETAL    3,216,192
AIRCRAFT JET CONTROL
Original Filed Oct. 4, 1960    2 Sheets-Sheet 1
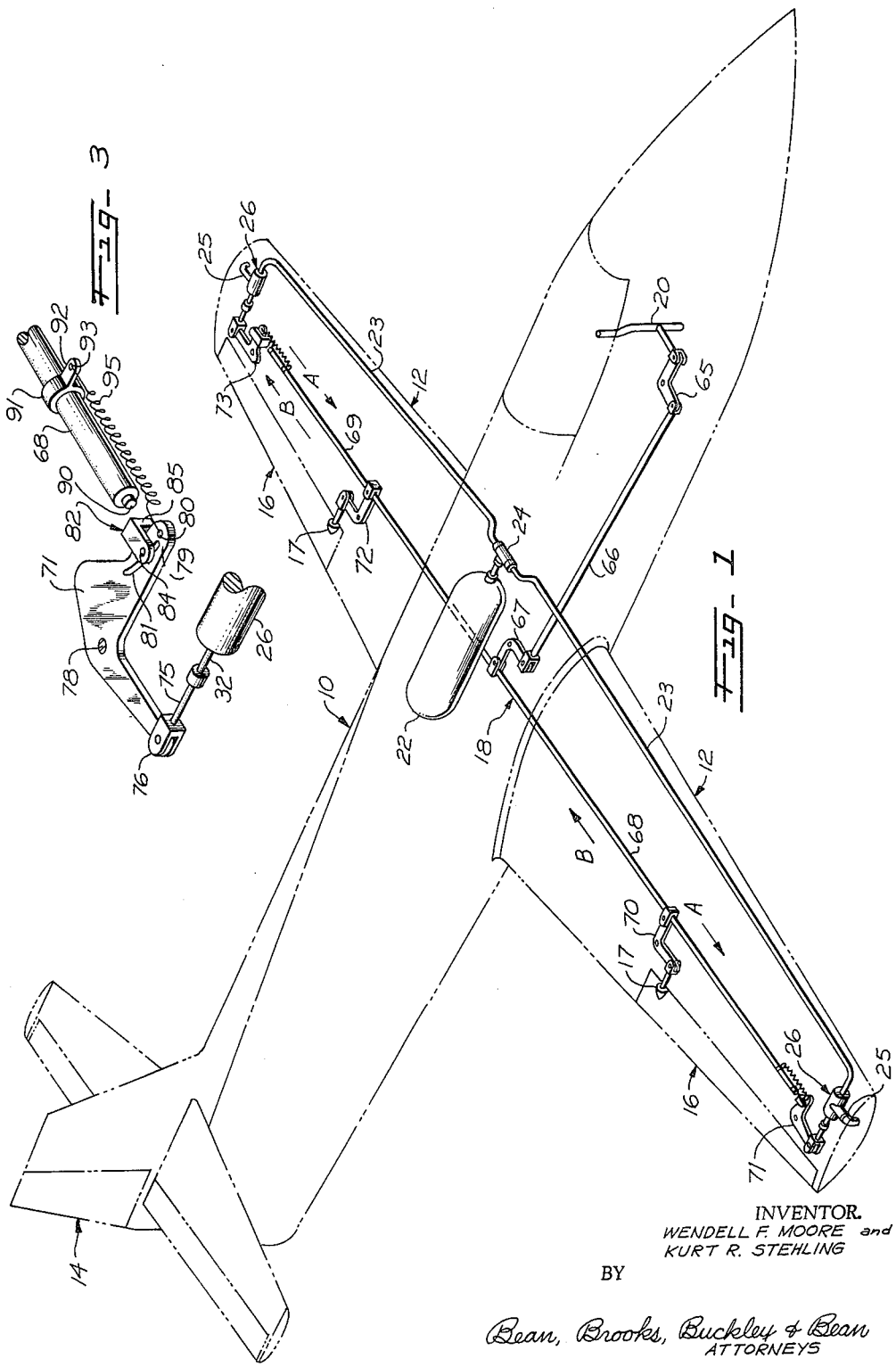
INVENTOR.
WENDELL F. MOORE and
KURT R. STEHLING
BY
Bean, Brooks, Buckley & Bean
ATTORNEYS

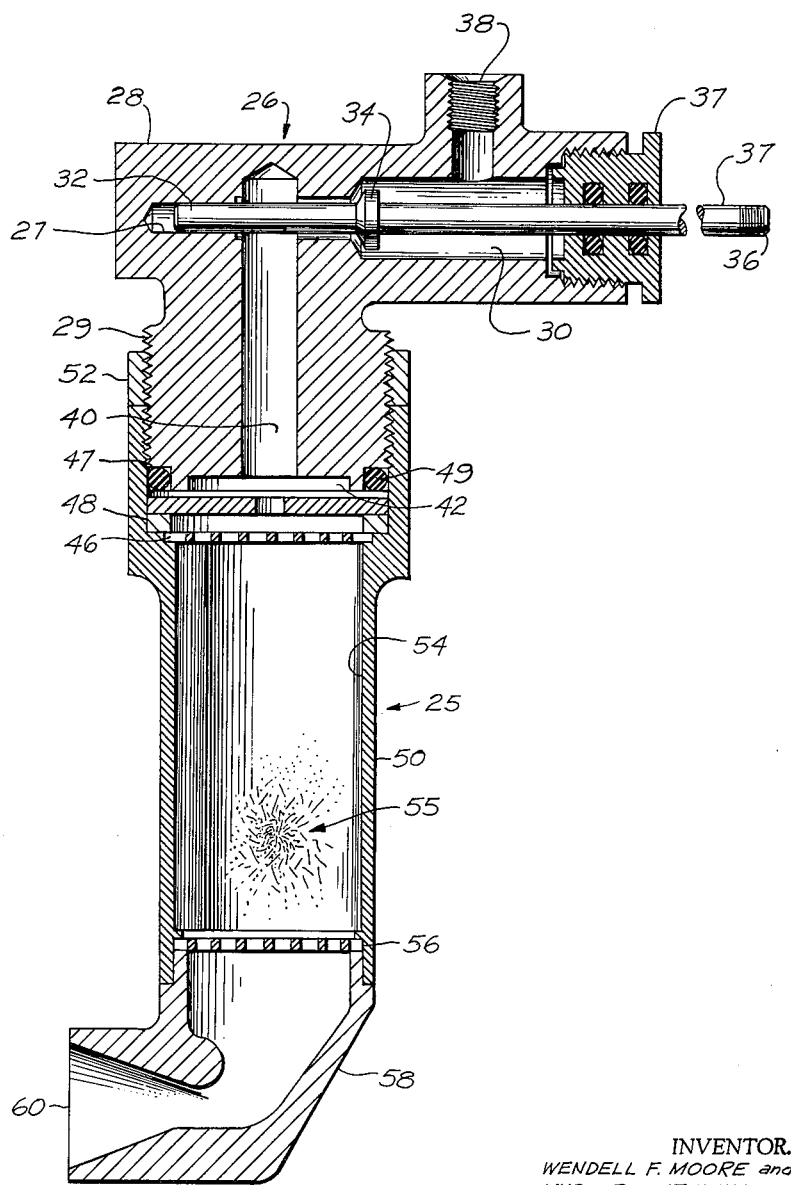

United States Patent Office 3,216,192
Patented Nov. 9, 1965

3,216,192
AIRCRAFT JET CONTROL
Wendell F. Moore, P.O. Box 414, Youngstown, N.Y., and Kurt R. Stehling, 95 Pine Oak Drive, Silver Spring, Md.
Original application Oct. 4, 1960, Ser. No. 60,337, now Patent No. 3,008,672, dated Nov. 14, 1961. Divided and this application July 28, 1961, Ser. No. 136,380
1 Claim. (Cl. 60—35.6)

This application is a division of application Ser. No. 60,337 which was filed Oct. 4, 1960 and matured into Patent No. 3,008,672 Nov. 14, 1961.

This invention relates to aircraft attitude and flight direction control means, and more particularly to high altitude aircraft attitude and directional control means.

It is a primary object of the present invention to provide an improved aircraft attitude and directional control means comprising combinations of aerodynamic reaction and rocket reaction or jet reaction means.

Another object of the invention is to provide in devices as aforesaid improved means for control of the aircraft in attitude and direction, automatically operable with improved facility at both low and high altitudes.

Another object of the invention is to provide improvements in control systems as aforesaid, whereby assistance is provided for the pilot in manual manipulations of the control system under highly loaded aerodynamic control surface conditions.

Other objects of the invention will appear from the specification hereinafter.

In the drawing:

FIG. 1 is a schematic perspective view of an airplane embodying an attitude control system of the present invention;

FIG. 2 is a sectional view, on enlarged scale, of a reaction nozzle device of the system of FIG. 1; and FIG. 3 is an enlarged perspective view of a portion of the control system shown in FIG. 1.

The invention contemplates, generally, provision of thrust reaction nozzles at suitable positions offset from the roll, yaw, and pitch axes of the aircraft; said nozzles comprising either rocket motors or thrust reaction nozzles operated by self-contained fuels or propellants supplied by one or more fuel tanks. In the form illustrated herein, the nozzles are supplied with hydrogen peroxide from a central storage tank and embody catalyst charges functioning to "fire" or "trigger" decomposition of the hydrogen peroxide as it enters the engine. Suitable control valve means also coupled to the conventional aerodynamic surface control system of the aircraft are so arranged that conventional pilot control motions are productive of proportionate attitude and directional control responses for maneuvering purposes by both the conventional aerodynamic control surface system and by the reaction nozzle devices.

For example, as illustrated in FIG. 1, an aircraft embodying the invention is designated generally at 10 to comprise a fuselage having opposite wing panels 12—12 and the usual tail empennage 14. To illustrate one example of the invention, the wings are provided with vertically pivotable ailerons 16—16 controlled by horns 17—17 and a push-pull rod and bell crank control system indicated generally by 18 coupled to a pilot control stick 20; as is well known in the art. It will, of course, be appreciated that the aircraft will also be provided with elevator and rudder control systems of presently conventional form (not shown); whereby the aircraft will be maneuverable in attitude and direction about its roll, pitch and yaw axes by pilot control of the aerodynamic surfaces referred to, at least under relatively low altitude conditions when in atmospheres providing adequate control reaction forces on the aerodynamic surfaces.

To provide for similar control of the aircraft when operating in rarified atmosphere at substantially higher altitudes and to augment the manually controlled pilot actuated aerodynamic surface control system, the aircraft may also embody one or more fuel tanks as indicated at 22 carrying fuel or propellants such as hydrogen peroxide, or the like, coupled to fuel supply lines as shown at 23—23 extending through the wing panels into connection with corresponding reaction nozzles 25—25. A valve, solenoid operated or otherwise controlled as indicated at 24 (FIG. 1) is provided for basic control of the thrust nozzle system, and may be either automatically actuated as by an altitude responsive bellows or a speed responsive device or an acceleration rate responsive device, or it may be pilot-actuated by any suitable remote control device. Thus, the valve 24 may be arranged so as to remain closed while the aircraft is flying at relatively low altitudes wherein the aerodynamic surfaces are adequate for control purposes, or it may be optionally opened to permit the thrust nozzles to augment the aerodynamic controls.

Valve 24 may be of a type as illustrated in U.S. Patent No. 1,557,822. This type of valve is connected into the system such that it is normally closed at relatively low altitudes in response to pressure existing at such altitudes, the valve being normally open at higher altitudes due to the degree of pressure existing at such higher altitudes. It is, of course, understood that the valve of the type shown in the aforementioned patent is connected in the fuel line between fuel tank 22 and the reaction thrust nozzles 25, 25.

Thus, it will be understood that whenever the aircraft approaches a relatively high altitude wherein the atmosphere is so rarified as to provide insufficient aerodynamic reaction forces against the control surfaces referred to hereinabove, the valve 24 will be opened to permit flow of propellant or fuel from the tank 22 through the conduits 23, 23. The nozzles 25—25 are individually controlled by means of valves indicated generally at 26—26; each valve comprising a housing 28 (FIG. 2) coupled to the corresponding reaction nozzle 25, by means of a screw thread connection as indicated at 29. In each case the housing 28 is bored as indicated at 27 and is counterbored as indicated at 30 to receive in free sliding relation therein a valve stem and disc unit 32, 34, comprising the control member of the valve device. The valve stem 32 terminates exteriorly of the housing in a screw-threaded portion 36 for connection with one end of the control system, which will be more fully hereinafter described.

The valve chamber 30 is arranged in communication with a fuel inlet port 38 which connects to the fuel supply line 23, and the valve stem 32 is pressure-sealed by means of a packing gland 37. Thus, it will be appreciated that alternative movements of the valve stem toward the right and left as viewed in FIG. 2 will alternately unseat and seat the valve disc 34 relative to the valve seat formed by the counterbore shoulder of the housing, so as to control the flow of fluid fuel from the inlet port 38 into a transverse bore 40 formed in the housing 28 and leading to the reaction nozzle 25. Preferably, the valve seat and valve disc portion 34 are taper-shaped to cause the valve to operate with a throttling action, as well as its "off" and "on" positions.

The discharge port 40 of the valve chamber 28 leads into an enlarged open end portion 42 in line with which is disposed a metering washer 44 and a dispersion grid 46; all of which parts are arranged in relatively spaced relation by means of spacers 47, 48, respectively, and sealed as indicated at 49. The housing portion 50 of the nozzle 25 is of generally cylindrical form and is interiorly shouldered at one end to accommodate the grid and meter and spacer devices 44, 46, 47, 48, as shown in FIG. 2; and is relatively assembled to the body 28 by means of the screw-thread connection 29 and a suitable lock nut as indicated at 52. The hollow interior 54 of the nozzle body 50 is packed with a suitable catalyst material for decomposing the hydrogen peroxide, as indicated at 55; the catalyst being retained therein between the dispersion grid 46 and a catalyst retainer grid 56 at the outer end of the nozzle body.

An elbow-shaped jet nozzle 58 is finally assembled upon the outer end of the nozzle body 50 to receive the stream of gaseous products issuing through the grid 56 and to divert it angularly for final discharge from the outlet nozzle portion 60 in a direction normal to the horizontal attitude plane of the aircraft. It will be appreciated that the nozzle body portion 50 and the valve body portion 28 may be readily nested within the aerodynamic profile of the aircraft wing panel 12, while the discharge nozzle 60 may be disposed to discharge downwardly below the wing panel while being substantially flush with the under surface thereof. Obviously, the component parts 28, 50, 58, may be relatively rotated so as to permit any convenient mode of assembly and disposition of the device in the airplane wing profile, according to conditions prevailing in any given airplane design.

Referring now to FIGS. 1 and 3 of the drawing, the control system will be more fully described and the inter-cooperation between the ailerons and the jet nozzles will be more fully understood. The control stick 20 is connected with a first bell crank 65 which is in turn connected with a push-pull rod 66 connected with another bell crank 67, bell crank 67 in turn being connected with push-pull rods 68 and 69 which extend outwardly in the opposite wings, rod 68 being connected with bell cranks 70 and 71 while rod 69 is connected with bell cranks 72 and 73.

It will be noted that bell cranks 70 and 72 are in turn connected with the horns 17 of the associated ailerons such that reciprocatory movement of rods 68 and 69 operates the ailerons of the opposite wings in opposite directions.

Bell crank 71 is operatively connected with one of the control valves 26 while the other bell crank 73 is operatively connected with the other control valve 26 in the opposite wing. Rods 68 and 69 are operatively connected with the bell cranks 71 and 73 respectively through a lost motion connection, the two lost motion connections being similar to one another, but in reverse position. The construction of the lowermost lost motion connection as seen in FIG. 1 is illustrated in the enlarged view shown in FIG. 3.

As seen in FIG. 3, the valve stem 32 extends outwardly of the control valve 26 and is threadedly connected with a link 75 which is in turn pivotally connected with one end of the bell crank 71 at 76. Bell crank 71 is fixedly pivoted at 78 and the opposite leg portion 79 thereof is provided with an opening 80 and an elongated slot 81. An abutment member 82 includes a first leg 83 which is provided with an opening therethrough through which extends a bolt means 84 for securing the abutment member 82 in a particular position in slot 81. Slot 81 permits adjustment of the abutment along leg portion 79 so that the abutment member may be positioned for proper operation with the associated push-pull rod. Abutment member 82 also includes a depending leg portion 85.

The outer end of push-pull rod 68 is provided with a longitudinally extending projection 90, projection 90 being adapted to engage the depending leg portion 85 of the abutment member. It is apparent that when push-pull rod 68 is moved into engagement with the abutment member and then moved further in the same direction, the bell crank 71 will be pivoted clockwise as seen in FIG. 3.

Push-pull rod 68 is also provided with a collar 91 suitably fixed in position thereon and including an outstanding ear 92 having an opening 93 formed therein. A tension spring 95 has the opposite ends thereof disposed within openings 93 and 80 for producing a constant tension between the ear portion 92 and the outer end of the bell crank 71.

It is evident that tension spring 91 will produce a constant tension on the outer end of the bell crank 71 tending to rotate it in a counter clockwise direcion as shown in FIG. 3. Accordingly, when the push-pull rod 68 is in the neutral position as indicated in FIG. 3 or is moved away from the bell crank 71, the bell crank will be moved to its limit of movement in a counter clockwise direction which causes the valve stem 32 to be urged inwardly thereby seating the valve disc portion 34 upon its associated seat and closing the valve.

It will, of course, be understood that the construction and operation of the interconnection between push-pull rod 69 and bell crank 73 is identical to the connection abovedescribed.

For the purposes of clarity, the projection 90 has been shown as being spaced from abutment member 82, although in actual practice, the projection 90 in the neutral position of the system will be in engagement with the associated abutment member or only slightly spaced therefrom such that operation of the ailerons is followed almost immediately by corresponding energization of the jet nozzle associated with the same wing.

Considering now the operation of the control system, assuming the two ailerons are in neutral position, each of the bell cranks 71 and 73 will be rotated by the spring tension of the associated lost motion connection such as to close both of the valves 26. Assuming now that the control stick is actuated such as to move push-pull rods 68 and 69 in the direction of arrows A, this motion will cause aileron 16 to be lowered thereby increasing the lift on the associated wing while the opposite aileron 16 is raised to decrease the lift on the opposite wing. As push-pull rod 68 moves in the direction of arrow A projection 90 will push upon abutment member 82 and rotate bell crank 71 in a clockwise direction as seen in the drawing thereby opening the associated valve 26 and energizing the associated jet nozzle.

On the other hand, movement of push-pull rod 69 in the direction of arrow A moves the projection on push-pull rod 69 away from the abutment member of bell crank 73 thereby increasing the spring tension in the associated lost motion connection such that the control valve associated with bell crank 73 will remain closed.

It is evident that movement of the push-pull rods 68 and 69 in the direction of arrows B will cause the control valve associated with bell crank 71 to close, and the control valve 26 associated with bell crank 73 will be opened with continued movement of the push-pull rods in the direction of arrows B.

As seen in FIG. 2, the control valve 26 is partially open and the valve disc 34 has been moved away from its associated seat. It will be appreciated that the valve control stem portions 36 are connected into the aileron actuating control system of the aircraft such that as the pilot moves the control stick for attitude correction of the aircraft, the ailerons 16, 16 are thereby actuated in a conventional manner while the valve devices 26, 26 are differentially actuated so as to provide assistance in controlling the aircraft. As long as the main control valve 24 is closed, no fuel will flow from the supply tank 22 to the nozzles 25—25 and thus at relative low altitude flight conditions wherein the ailerons produce adequate reaction control forces, the fuel of the tank 22 is conserved.

However, in flying at higher altitudes in rarified atmosphere, such that the ailerons provide inadequate control reaction forces or when the pilot requires assistance in operating the aerodynamic control surfaces against the forces of the relative air stream, the valve 24 will be opened to permit flow of fuel to the nozzle valves 26, 26. The differential actuations of the control valves 26, 26, responsive to pilot manipulations of the control column 20 will then cause the nozzles 25, 25 to operate so as to direct thrust reaction streams downwardly under the wing panel tips, thereby providing attitude control forces tending to roll the aircraft about its longitudinal roll axis. Thus, it is a particular feature of the invention that the attitude control nozzles are at all times readily operable without the use of ignition systems and separate controls therefor, or other control and accessory devices such as would unduly complicate the system.

It will of course be appreciated that whereas the invention has been hereinabove described only in conjunction with a roll control or lateral attitude control system for the aircraft, similar systems may of course be provided to control the aircraft about its yaw and pitch axes, in conjunction with the conventional rudder and elevator control systems. However, in the interest of simplification of this specification these other systems are not illustrated or described in any greater detail herein. Thus, although only one form of this invention has been described in detail, it will be understood that various changes may be made therein without departing from the spirit of the invention or the scope of the following claim.

We claim:

A reaction thrust engine comprising a catalyst housing providing therewithin a chamber having inlet and outlet ends, said housing having adjacent its inlet end means mounting thereat a fluid fuel inlet metering port device extending transversely of the inlet end portion of said chamber and a fuel dispersion grid device disposed in spaced parallel relation thereto, a gas dispersion grid member disposed transversely thereof at the outlet end of said catalyst housing, a catalytic substance disposed in said chamber between said fuel dispersion grid and said gas dispersion grid, a gas thrust discharge nozzle comprising a conduit for carrying the gaseous products of reaction of said fuel with the said catalyst, and a control valve housing having one of its end portions connected to the inlet end of said catalyst housing to deliver fuel to said catalyst housing, said valve housing being internally bored to provide a fuel passageway therethrough and having a fuel inlet port in communication with said passageway, a valve stem displaceably mounted within said passageway and extending at one end externally therefrom for connection to a pilot control device, said passageway being formed with a valve seat portion intermediately of its ends, said valve stem being formed with a valve head cooperative with said valve seat portion to provide on-off fuel flow control according to positional adjustments of said valve stem, said fuel inlet port extending into said valve housing in communication with said passageway at a position ahead of said valve head, said valve housing including a cylindrical portion enclosing said fuel outlet bore, and said cylindrical portion and said catalyst housing being relatively mounted by a screw thread connection therebetween with said fuel metering port device and said fuel dispersion grid device being mounted therebetween.

References Cited by the Examiner
UNITED STATES PATENTS

| | | | |
|---|---|---|---|
| 591,228 | 10/97 | Goltermann | 251—321 X |
| 1,897,092 | 2/33 | Weir | 60—35.6 X |
| 2,721,788 | 10/55 | Schad. | |
| 2,827,762 | 3/58 | Towns | 60—35.6 |
| 2,865,721 | 12/58 | Lane et al. | |
| 2,930,184 | 3/60 | Plescia et al. | |
| 3,040,521 | 6/62 | Broughton et al. | 60—39.46 X |

JULIUS E. WEST, *Primary Examiner.*

SAMUEL LEVINE, *Examiner.*